(12) United States Patent
Czibur et al.

(10) Patent No.: US 9,871,363 B1
(45) Date of Patent: Jan. 16, 2018

(54) SEAL SYSTEMS FOR OIL-FILLED CABLE TERMINATIONS AND ASSEMBLIES AND METHODS INCLUDING THE SAME

(71) Applicant: TE Connectivity Corporation, Berwyn, PA (US)

(72) Inventors: Alexander R. Czibur, Fuquay-Varina, NC (US); Mahmoud Seraj, Apex, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/460,365

(22) Filed: Mar. 16, 2017

(51) Int. Cl.
*H02G 15/23* (2006.01)
*H02G 15/007* (2006.01)
*H02G 15/18* (2006.01)
*H01B 13/00* (2006.01)

(52) U.S. Cl.
CPC ......... *H02G 15/23* (2013.01); *H01B 13/0036* (2013.01); *H02G 15/007* (2013.01); *H02G 15/1806* (2013.01)

(58) Field of Classification Search
CPC ............. H01B 13/0036; H02G 15/007; H02G 15/1806
USPC ....... 174/73.1, 40 R, 143, 15.3, 14 BH, 23 R
See application file for complete search history.

(56) References Cited

U.S. PATENT DOCUMENTS

| | | | |
|---|---|---|---|
| 3,715,449 A | | 2/1973 | Cunningham et al. |
| 3,716,652 A | * | 2/1973 | Lusk .................... H01B 17/005 174/15.3 |
| 4,046,958 A | * | 9/1977 | Lusk ..................... H02G 15/06 174/73.1 |
| 4,079,186 A | * | 3/1978 | Lusk ..................... H02G 15/22 174/14 BH |
| 4,228,318 A | * | 10/1980 | Selsing .................. H02G 15/22 174/143 |
| 2013/0183003 A1 | * | 7/2013 | Cairns .................. G02B 6/4428 385/77 |
| 2014/0076624 A1 | * | 3/2014 | Bohlin ................. H02G 15/046 174/40 R |
| 2014/0182878 A1 | * | 7/2014 | Quaggia ................ H02G 15/06 174/73.1 |

OTHER PUBLICATIONS

Brochure, "Oil-Filled Termination Up to 245 kV", Energy///Oil-Filled Termination, TE Connectivity, 4 pages, available as of filing date.

(Continued)

*Primary Examiner* — Timothy Thompson
*Assistant Examiner* — Michael F McAllister
(74) *Attorney, Agent, or Firm* — Myers Bigel, P.A.

(57) ABSTRACT

An assembly for use with an oil-filled cable termination includes a cable gland, a cable received in the cable gland, a stress cone received around the cable and spaced apart from the cable gland, and a seal system around the cable between the cable gland and the stress cone. The seal system includes: a first oil seal layer surrounding an upper portion of the cable gland and a portion of the cable between the cable gland and the stress cone, with the first oil seal layer being spaced apart from the stress cone; a second oil seal layer surrounding the first oil seal layer and extending between the cable gland and the stress cone; and a third oil seal layer surrounding the second oil seal layer and extending between the cable gland and the stress cone.

19 Claims, 17 Drawing Sheets

(56) References Cited

OTHER PUBLICATIONS

Brochure, "Raychem High Voltage Cable Accessories up to 170 kV", Raychem from TE Connectivity, 56 pages, available as of filing date.

\* cited by examiner

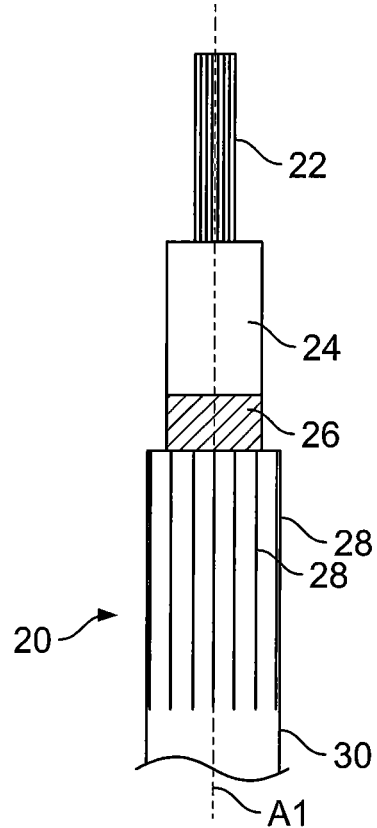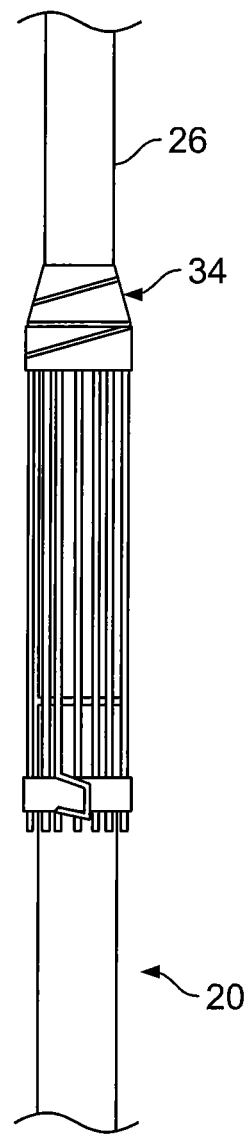
FIG. 2
FIG. 3

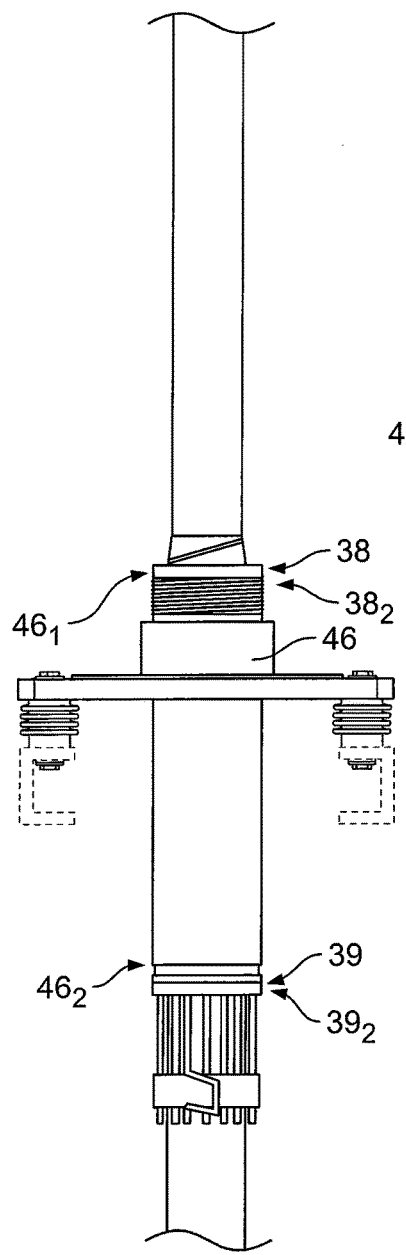
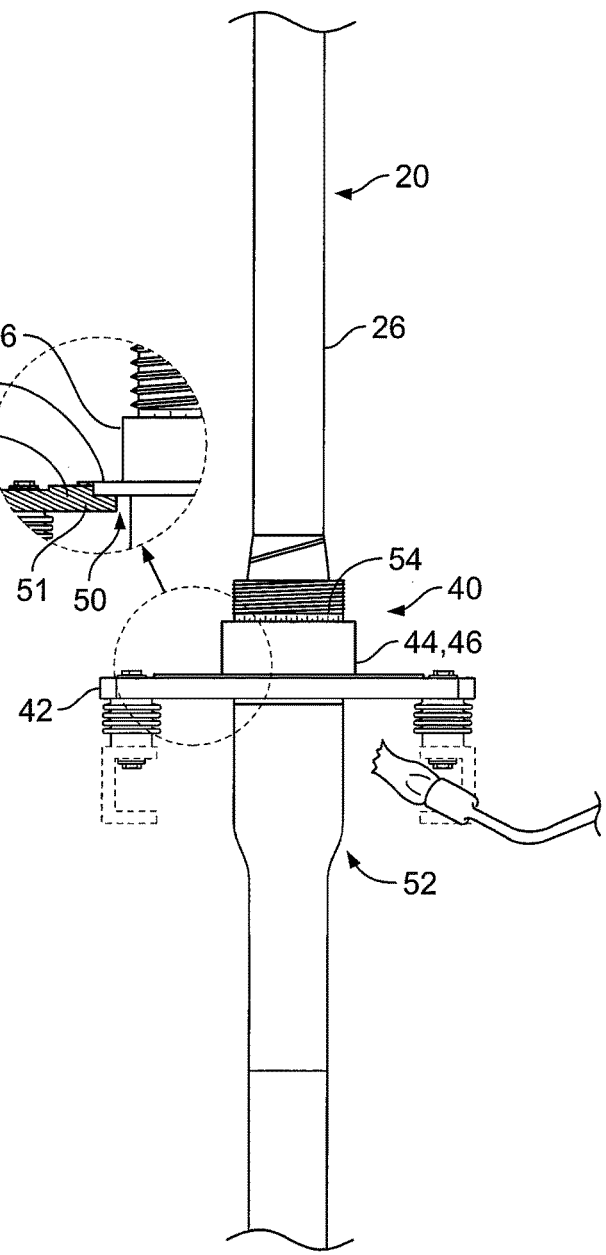
FIG. 8  FIG. 9

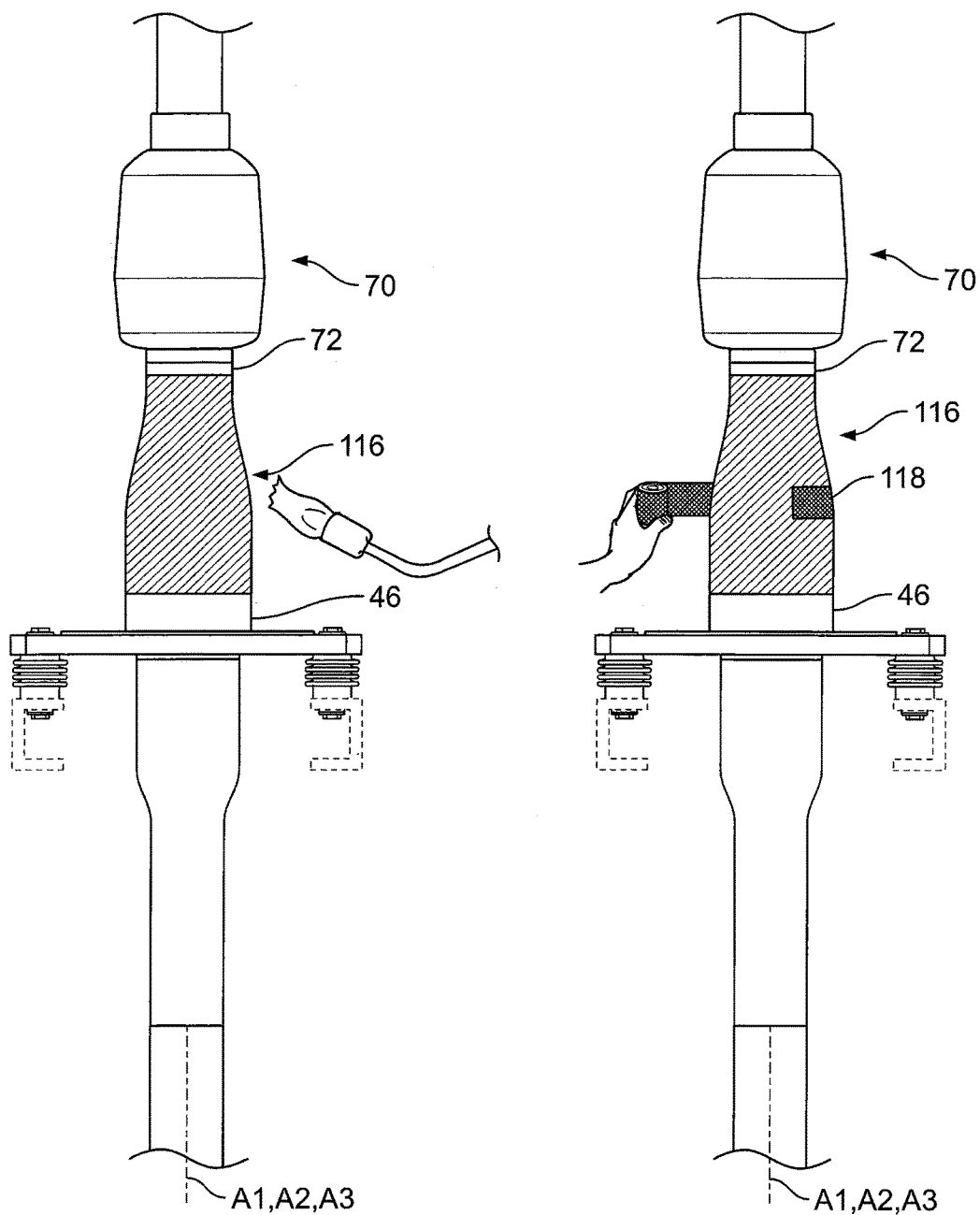
FIG. 18  FIG. 19

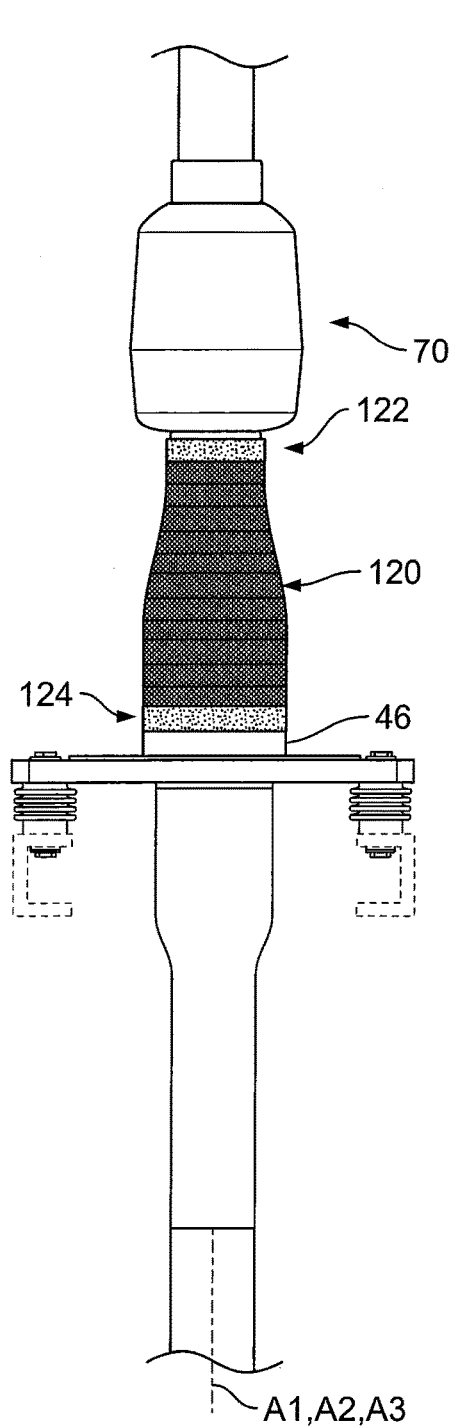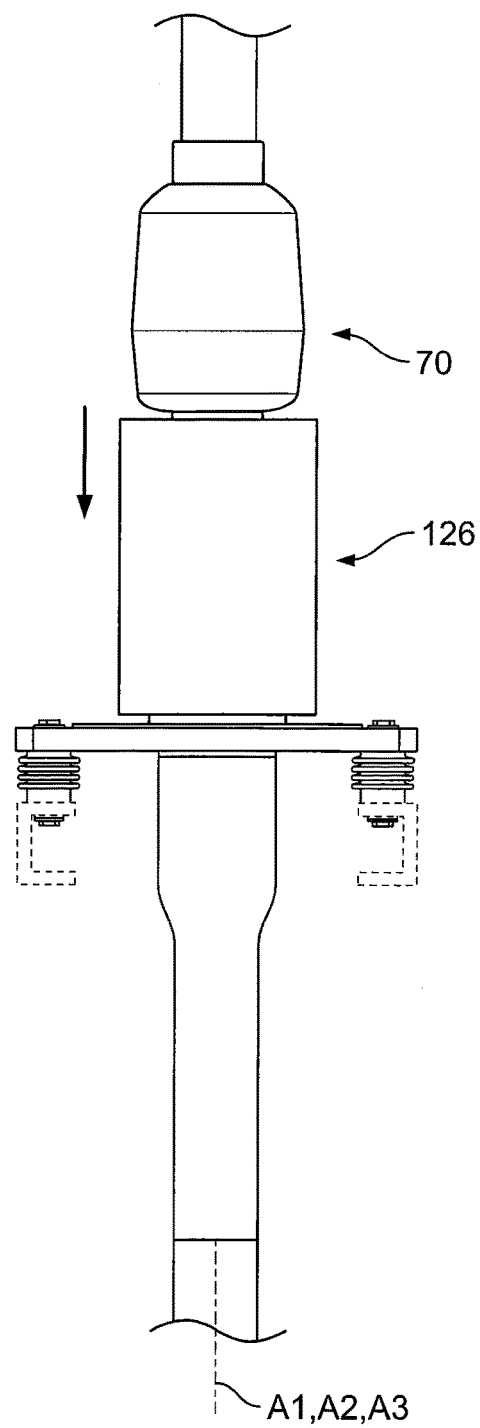
FIG. 20   FIG. 21

SEAL SYSTEMS FOR OIL-FILLED CABLE TERMINATIONS AND ASSEMBLIES AND METHODS INCLUDING THE SAME

BACKGROUND

Some cable terminations, such as those used for high voltage outdoor applications, include an electrically insulative housing around the cable. The housing is sometimes filled with oil to serve as a dielectric medium between the cable and the housing.

SUMMARY

Some embodiments of the present invention are directed to an assembly for use with an oil-filled cable termination. The assembly includes a cable gland, a cable received in the cable gland, a stress cone received around the cable and spaced apart from the cable gland, and a seal system around the cable between the cable gland and the stress cone. The seal system includes: a first oil seal layer surrounding an upper portion of the cable gland and a portion of the cable between the cable gland and the stress cone, with the first oil seal layer being spaced apart from the stress cone; a second oil seal layer surrounding the first oil seal layer and extending between the cable gland and the stress cone; and a third oil seal layer surrounding the second oil seal layer and extending between the cable gland and the stress cone.

Some other embodiments of the present invention are directed to a method for forming a seal system for an oil-filled cable termination comprising a cable that is received through each of a cable gland and a stress cone that is spaced apart from the cable gland. The method includes: forming a first oil seal layer around the cable by heating a first heat shrinkable tube; forming a second oil seal layer over the first oil seal layer by heating a second heat shrinkable tube; and forming a third oil seal layer over the second oil seal layer by heating a third heat shrinkable tube. The first oil seal layer overlaps and contacts the cable gland and is spaced apart from the stress cone. The second oil seal layer extends between the cable gland and the stress cone. The third oil seal layer extends between the cable gland and the stress cone.

Some other embodiments of the present invention are directed to an assembly for use with an oil-filled cable termination. The assembly includes a cable gland including a plate portion and a tubular portion, with the tubular portion including a first end and an opposite second end, and with the plate portion surrounding the tubular portion between the first and second ends thereof. The assembly includes a cable received in the tubular portion of the cable gland. The assembly includes a base plate including a seat defining an opening, with the cable gland plate portion being configured to be held on the base plate seat such that the cable and the cable gland tubular portion extend through the opening. The assembly includes first and second grommets. The first grommet is configured to be received in the cable gland tubular portion at the first end thereof and the second grommet configured to be received in the cable gland tubular portion at the second end thereof. The first and second grommets are configured to hold the cable gland tubular portion in position such that the first end of the cable gland tubular portion is above the base plate and the second end of the cable gland tubular portion is below the base plate.

BRIEF DESCRIPTION OF THE DRAWINGS

FIG. 2 is a side view of a cable used in the cable termination of FIG. 1 according to some embodiments.

FIGS. 3 and 4 are side views illustrating the cable of FIG. 2 with a semiconductor layer received thereon according to various embodiments.

FIG. 8 is a side view illustrating the grommets of FIG. 7 helping to position the cable gland of FIG. 6 according to some embodiments.

FIG. 9 is a side view illustrating the application of a lower seal on the cable of FIG. 2 and/or the cable gland of FIG. 6 according to some embodiments.

FIG. 16 is a side view illustrating the application of a mastic layer over the cable gland of FIG. 6 according to some embodiments.

FIGS. 17 and 18 are side views illustrating the application of a second oil seal layer over the first oil seal layer of FIG. 12 according to some embodiments.

FIGS. 19 and 20 are side views illustrating the application of a conductive mesh layer over the second oil seal layer of FIG. 18 according to some embodiments; FIG. 20 also illustrates the application of upper and lower mastic layers according to some embodiments.

FIGS. 21 and 22 are side views illustrating the application of a third oil seal layer over the second oil seal layer of FIG. 18 according to some embodiments.

DETAILED DESCRIPTION

Figure 1:
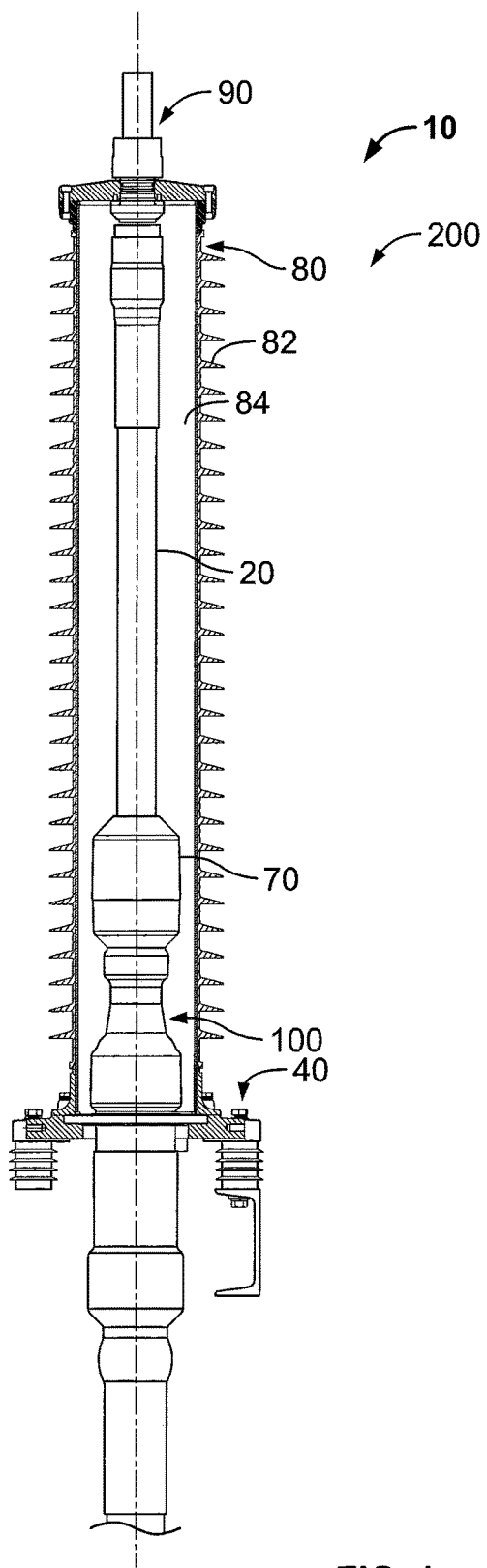
FIG. 1 is a partial sectional view of an oil-filled cable termination according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An oil-filled cable termination assembly 10 is illustrated in FIG. 1. The assembly 10 includes an electrical cable 20. As will be described in more detail below, the cable 20 is received through a base plate and cable gland assembly 40 and a stress cone 70. An insulator housing assembly 80 includes an insulator housing 82 that is at least partially filled with a fluid 84 such as oil. The oil may serve as a dielectric medium between the cable 20 and the housing 80. A conductor of the cable 20 is received in a lug 90. As will also be described in more detail below, a seal assembly or system 100 provides a seal around the cable 20 between the base plate and gland assembly 40 and the stress cone 70.

The cable 20 may have the configuration shown in FIG. 2. The cable 20 includes a primary electrical conductor 22, a polymeric insulation layer 24, a semiconductor layer 26 and an outer jacket 30. The primary conductor 22 may be formed of any suitable electrically conductive material such as copper (solid or stranded). The polymeric insulation layer 24 may be formed of any suitable electrically insulative material such as crosslinked polyethylene (XLPE) or ethylene propylene rubber (EPR). The semiconductor layer 26 may be formed of any suitable semiconductor material such as carbon black with silicone. The jacket 30 may be formed of any suitable material such as EPDM or PVC.

An electromagnetic shield layer may be between the semiconductor layer 26 and the jacket 30. Neutral wires 28 from the electromagnetic shield layer may be folded back onto the jacket 30. The wires 28 may be formed of any suitable material such as copper.

The cable 20 may be a high voltage power cable. For example, the cable 20 may be a 138 kV power cable. The cable 20 may be an electrical power transmission cable.

Referring to FIG. 3, a semiconductor layer 34 may be applied on the semiconductor layer 26 of the cable. The semiconductor layer 34 may be formed by, for example, wrapping semiconductive tape (e.g., EPR tape) around the cable 20.

Figure 4:
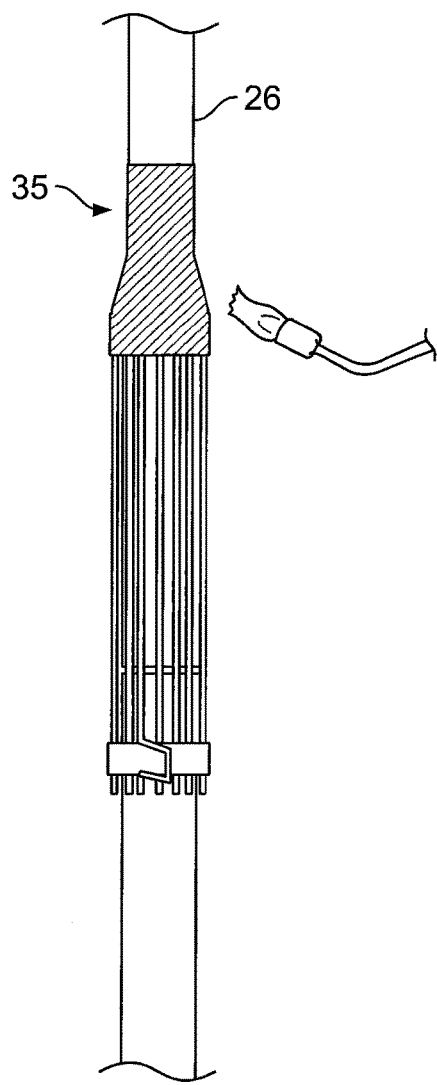

Alternatively, as shown in FIG. 4, a semiconductor layer 35 may be applied on the semiconductor layer 26 of the cable 20. As illustrated, a heat shrinkable tube may be used to form the semiconductor layer 35. A suitable tube is the CNTM product available from TE Connectivity. According to some embodiments, the heat shrinkable tube includes EPR or EPDM rubber. The use of a heat shrinkable tube may reduce installation time by eliminating the need to wrap semiconductive tape around the cable 20.

Figure 5:
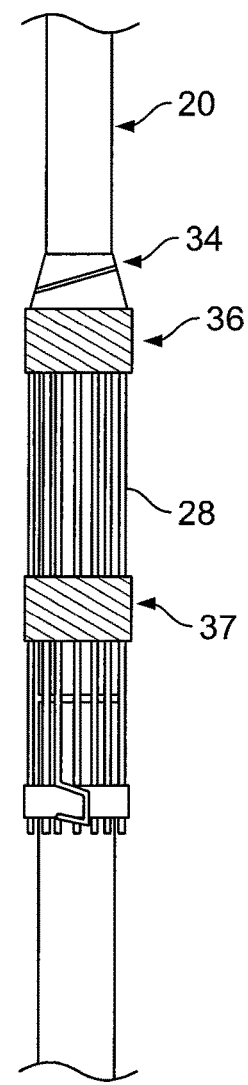
FIG. 5 is a side view illustrating the cable of FIG. 2 with fabric layers received thereon according to some embodiments.

Referring to FIG. 5, a first or upper fabric layer 36 and a second or lower fabric layer 37 may be applied on the cable 20. As described in more detail below, the fabric layers 36, 37 may be used to help position a portion of the base plate and cable gland assembly 40. The upper fabric layer 36 may be on the semiconductor layer 34 (or the semiconductor layer 35 shown in FIG. 4) and/or on the neutral wires 28 of the cable 20. The lower fabric layer 37 may be on the neutral wires 28 of the cable 20. The fabric layers 36, 37 may be formed by wrapping fabric tape (e.g., cotton tape) around the cable 20.

Figure 6:
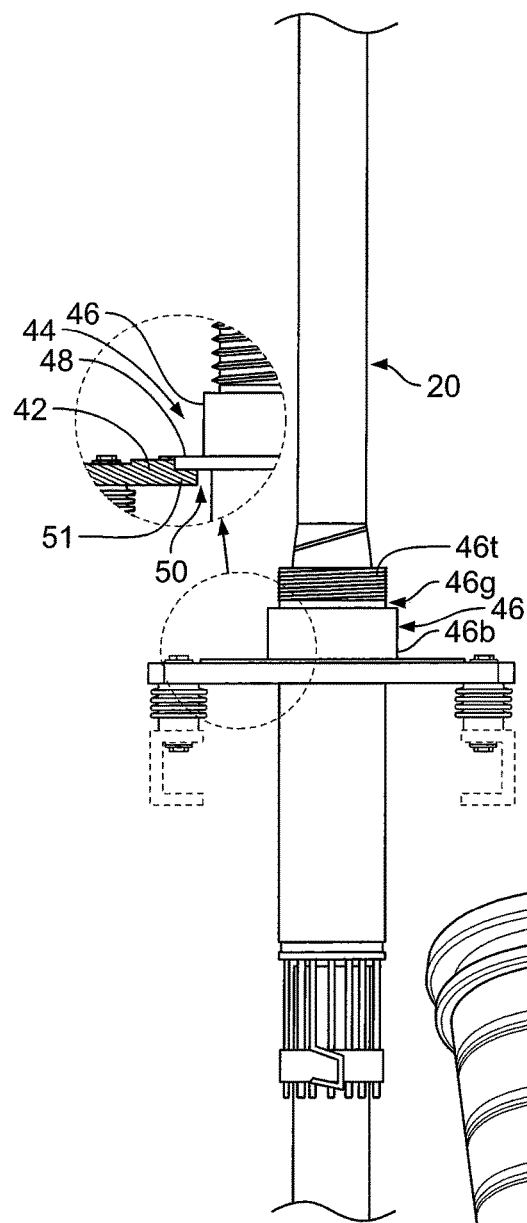
FIG. 6 is a side view illustrating the cable of FIG. 2 received in a cable gland according to some embodiments.

Referring to FIG. 6, the base plate and cable gland assembly 40 includes a base plate 42 and a cable gland 44. The gland 44 includes a tubular portion 46 that is sized and configured to receive the cable 20 and a plate portion 48 that surrounds the tubular portion 46. The plate portion 48 is sized and configured to fit (be seated) within an opening 50 in the base plate 42. The cable 20 may be received through the base plate 42 and then received in the cable gland 44.

More specifically, the base plate 42 may include a seat 51 that defines the opening 50. The cable gland plate portion 48 may be held on the seat 51 and the cable 20 and the cable gland tubular portion 46 may extend through the opening 50.

The cable gland tubular portion 46 may include a base or base portion 46b and a threaded portion 46t above the cable gland plate portion 48. Threads may be helically disposed on the threaded portion 46t. A groove 46g may be provided between the base portion 46b and the threaded portion 46t. The cable gland tubular portion 46 may have a stepped configuration such that an outer diameter of the base portion 46b is greater than an outer diameter of the threaded portion 46t.

The fabric layers 36, 37 (FIG. 5) may help hold the cable gland 44 in the position shown in FIG. 6. For example, each of the fabric layers 36, 37 may have an outer diameter that is the same or substantially the same as an inner diameter of the cable gland tubular portion 46.

Figure 7:
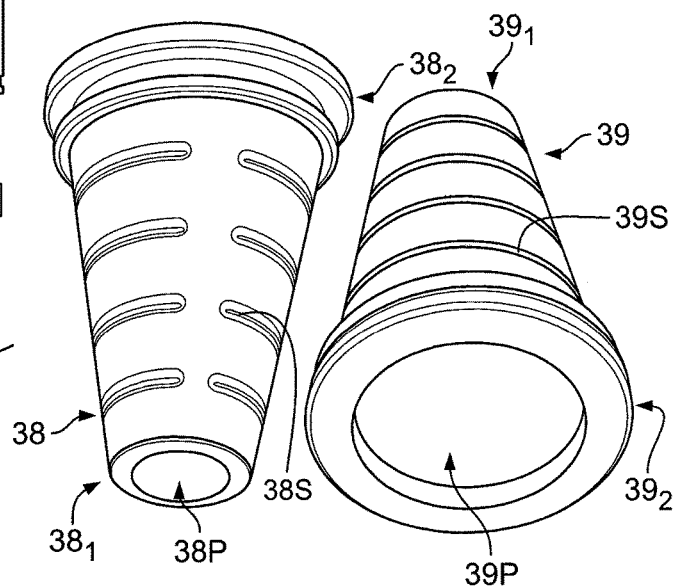
FIG. 7 is a perspective view of grommets that may be used to help position the cable gland of FIG. 6 according to some embodiments.

The fabric layers 36, 37 may be omitted in some embodiments. Referring to FIG. 7, grommets 38, 39 may be used to hold the cable gland 44 in the position shown in FIG. 6. The grommet 38 may have a frustoconical or generally frustoconical shape with first and second opposed ends $38_1$, $38_2$ and may define a grommet passageway 38P. Similarly, the grommet 39 may have a frustoconical or generally frustoconical shape with first and second opposed ends $39_1$, $39_2$ and may define a grommet passageway 39P.

As shown in FIG. 8, the grommets 38, 39 may be received around the cable 20 (i.e., the cable 20 may be received in each of the grommet passageways 38P, 39P). The grommet first ends $38_1$, $39_1$ may be received inside the cable gland tubular portion 46 at first and second opposite ends $46_1$, $46_2$ thereof, respectively. The grommet second ends $38_2$, $39_2$ may extend outside the cable gland tubular portion 46. The grommets 38, 39 may serve as a relatively high-friction interface between the cable 20 and the cable gland tubular portion 46 to help secure the cable gland 44 in the position shown in FIG. 8. The grommets 38, 39 may be formed of any suitable material such as rubber.

Referring again to FIG. 7, the grommet 38 may include a plurality of score lines 38S and the grommet 39 may include a plurality of score lines 39S. The score lines 38S, 39S may facilitate cutting the grommets 38, 39 such that the grommets 38, 39 have the appropriate inner diameter and/or length for a particular application (e.g., depending on the outer diameter of the cable 20 and/or the inner diameter of the cable gland tubular portion 46).

The grommets 38, 39 may reduce installation time by eliminating the need to wrap fabric tape around the cable 20.

Referring to FIG. 9, a lower seal assembly 52 may provide a seal between the cable 20 and a lower portion of the gland 44 (e.g., a lower portion of the gland tubular portion 46). For example, the seal assembly 52 may include one or more fabric layers, one or more mastic layers and/or heat shrinkable tubing.

A seal 54 such as an o-ring may be received in the cable gland groove 46g (FIG. 6).

Figure 10:
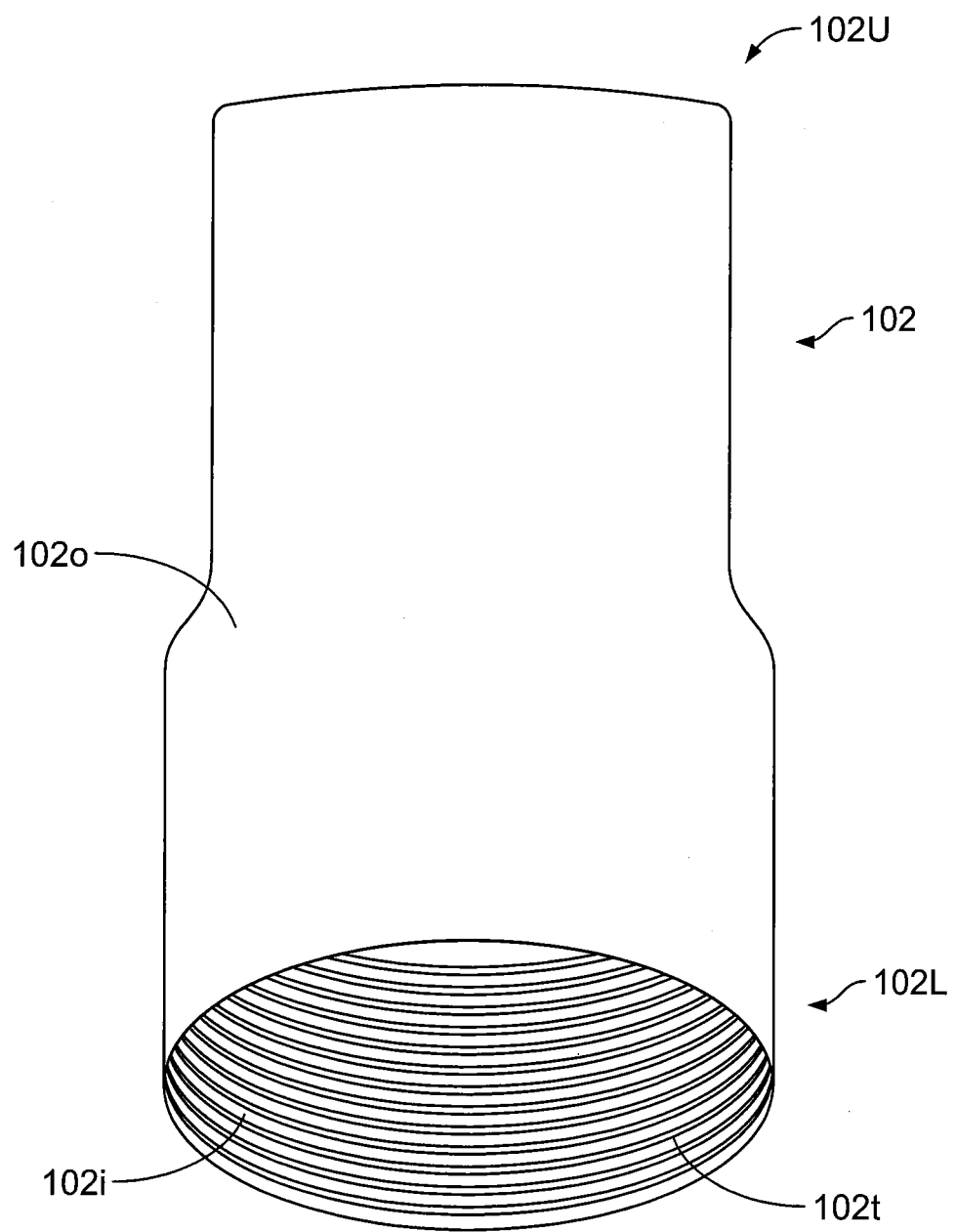
FIG. 10 is a perspective view of a heat shrinkable tube according to some embodiments.

A heat shrinkable, internally threaded tube 102 is illustrated in FIG. 10. The tube 102 includes a lower portion 102L and an opposite upper portion 102U. The tube 102 includes an inner surface 102i and an outer surface 102o. Threads 102t are on the inner surface 102i of the tube 102 at the lower portion 102L thereof. The threads 102t may be helically disposed on the inner surface 102i of the tube 102. The tube 102 may have a stepped or tapered configuration such that an outer diameter of the lower portion 102L is greater than an outer diameter of the upper portion 102U.

Figure 11:
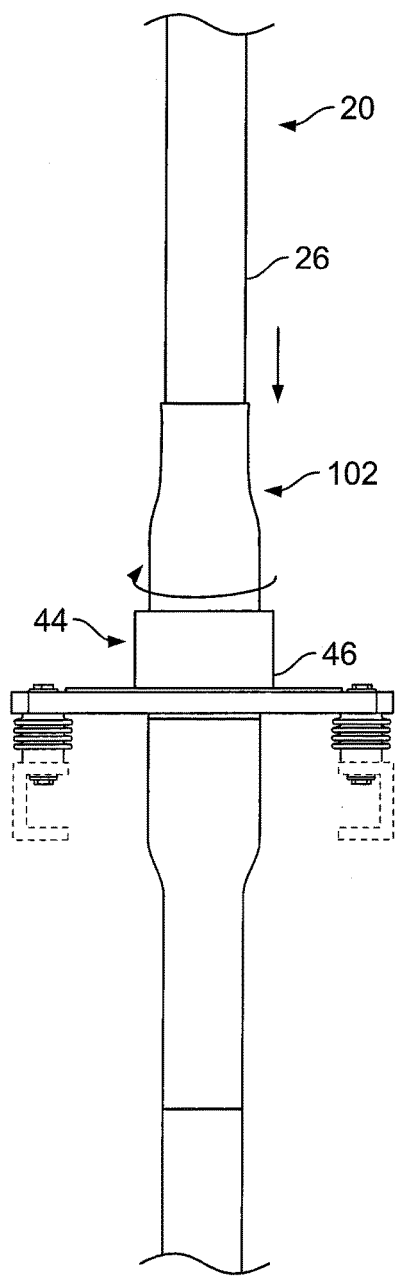
FIGS. 11 and 12 are side views illustrating the application of a first oil seal layer on the cable of FIG. 2 and the cable gland of FIG. 6 using the heat shrinkable tube of FIG. 10 according to some embodiments.

The tube 102 may be received around the cable 20 and slid downwardly toward the cable gland 44 as shown in FIG. 11. As also shown in FIG. 11, the tube 102 may be rotated so as to be threadingly engaged with the cable gland tubular portion 46. More specifically, the tube threads 102t (FIG. 10) may engage the cable gland threaded portion 46t (FIG. 6) such that the tube 102 can be tightened on the cable gland tubular portion 46.

Figure 12:
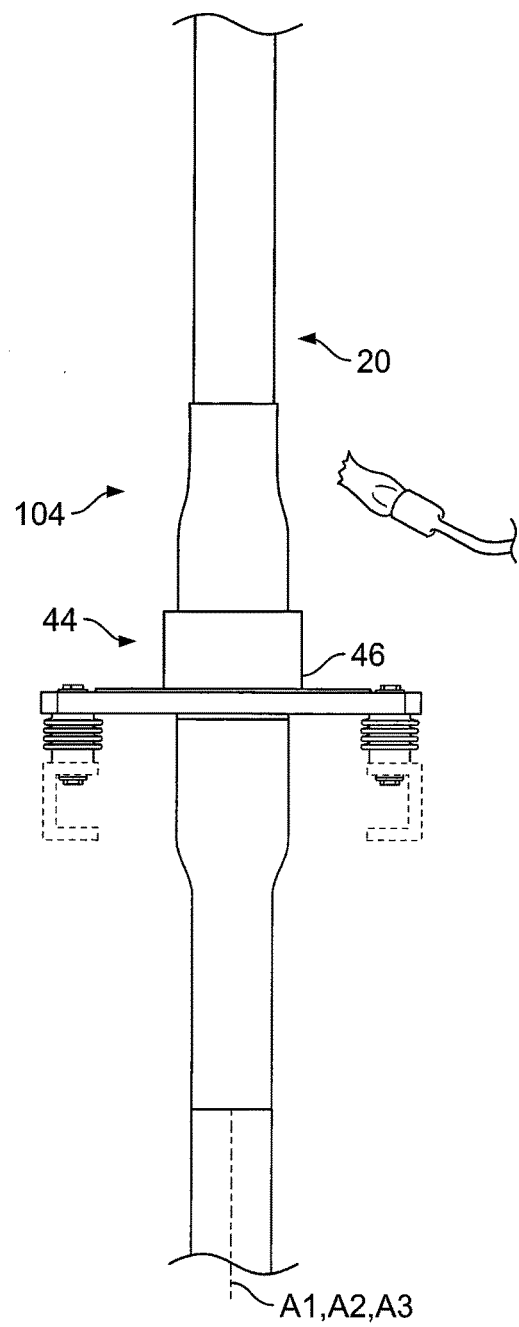

Referring to FIG. 12, heat is thereafter applied such that the tube 102 shrinks and conforms to the cable 20. This provides a first oil seal layer 104.

According to some embodiments, the tube 102 is electrically conductive or semiconductive. Therefore, the first oil seal layer 104 may be a conductive layer or a semiconductor layer. This may allow for semiconductor layer 34 (FIG. 3) or the semiconductor layer 35 (FIG. 4) to be omitted. This may reduce installation time by eliminating the need to wrap semiconductive tape around the cable 20 (FIG. 3) or to shrink a tube around the cable 20 (FIG. 4).

According to some embodiments, the heat shrinkable tube 102 includes a polyolefin such as EPR or EPDM rubber. A suitable tube 102 is a cable entry seal (CES) product available from TE Connectivity.

According to some embodiments, the cable gland tubular portion 46 does not include the threaded portion 46t and the heat shrinkable tube 102 does not include the threads 102t. In such embodiments, heat may be applied such that the lower portion 102L of the heat shrinkable tube 102 conforms to the cable gland tubular portion 46 and the upper portion 102U of the heat shrinkable tube 102 conforms to the cable 20.

Figure 13:
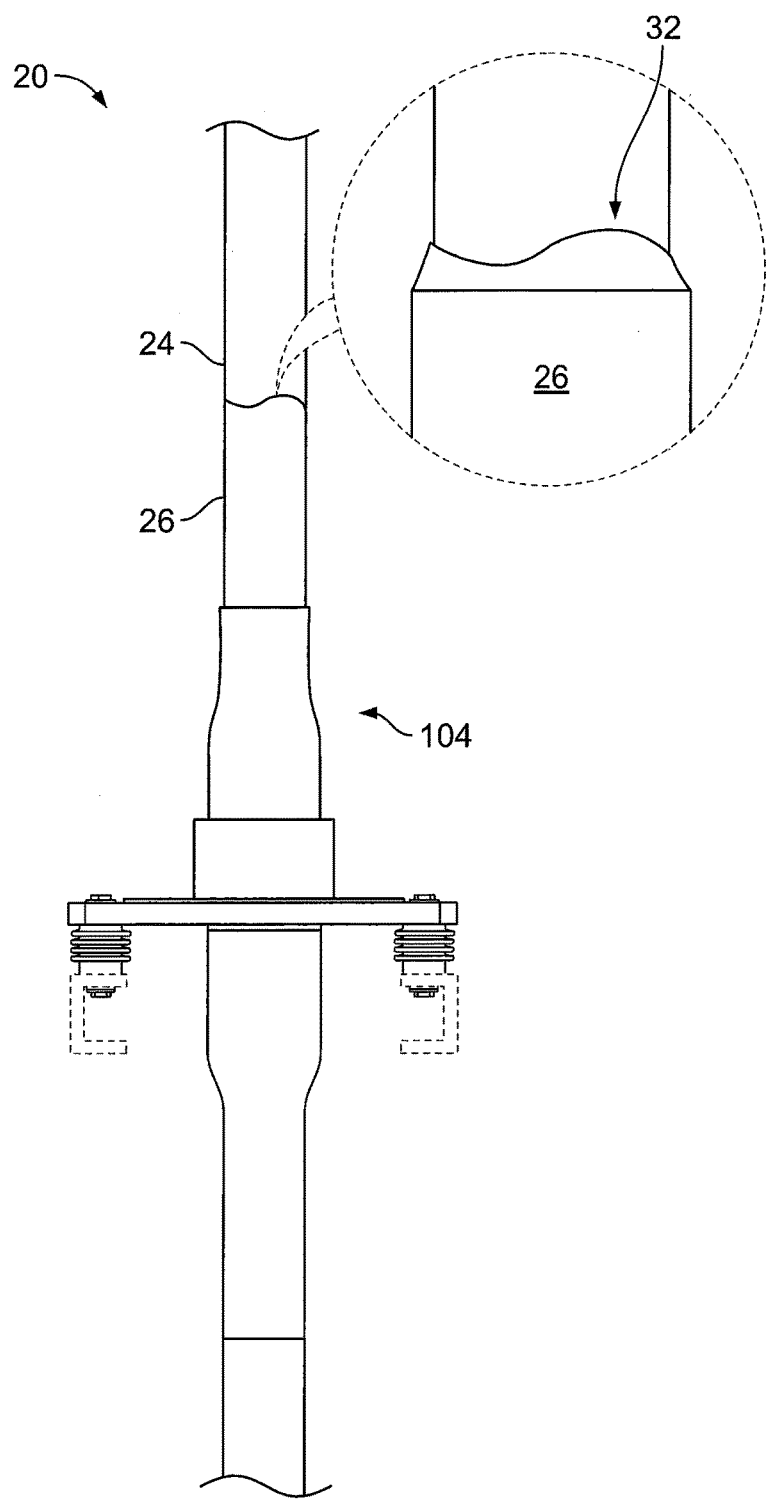
FIG. 13 is a side view illustrating the cable of FIG. 2 with a portion of a semiconductor layer thereof removed.

Referring to FIG. 13, before installing the stress cone 70, a portion of the cable semiconductor layer 26 is removed to expose the cable insulation layer 24. The cable semiconductor layer 26 may be removed to have a chamfered portion 32.

Figure 14:
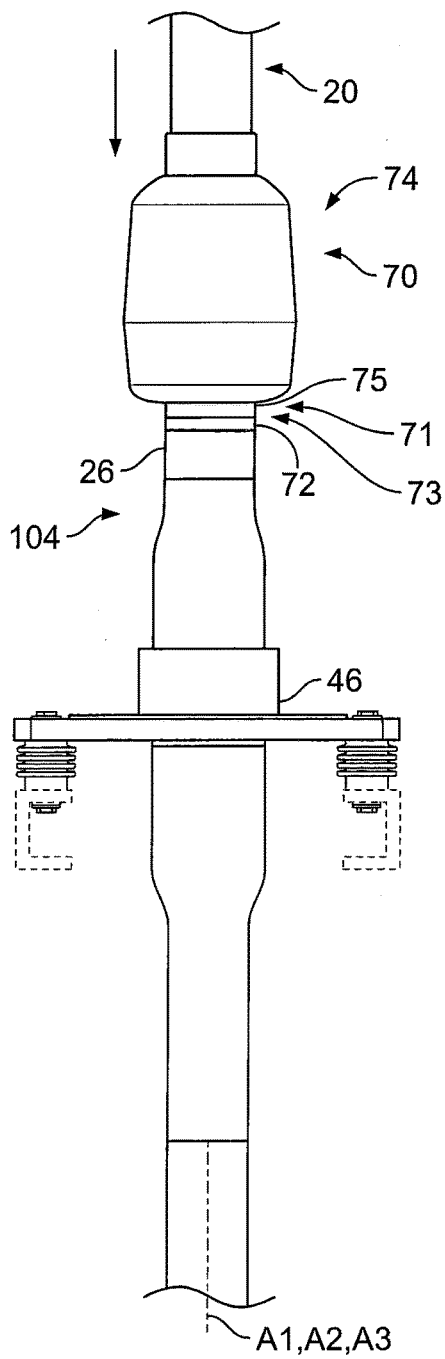
FIG. 14 is a side view illustrating a stress cone received around the cable of FIG. 2 according to some embodiments.

Referring to FIG. 14, the stress cone 70 is urged downwardly with the stress cone 70 surrounding the cable 20. The stress cone 70 includes a lower electrically conductive portion 71 and an upper electrically insulating or non-conductive portion 74. The stress cone 70 may include a collar 73. The conductive portion 71 of the stress cone 70 may include a lower portion 72 of the collar 73 (also referred to herein as the conductive collar 72 of the stress cone 70). The non-conductive portion 74 of the stress cone 70 may include an upper portion 75 of the collar 73. According to some embodiments, the stress cone 70 is installed such that the collar 73 surrounds the uppermost portion of the cable semiconductor layer 26 (e.g., the chamfered portion 32 shown in FIG. 13).

According to some embodiments, with the cable gland 44 and the stress cone 70 installed around the cable 20, a longitudinal axis A2 of the cable gland 44 (or the cable gland tubular portion 46) and/or a longitudinal axis A3 of the stress cone 70 may coincide or substantially coincide with a longitudinal axis A1 of the cable 20.

As illustrated in FIG. 14, the first oil seal layer 104 may not extend to the stress cone 70. As such, a portion of the cable semiconductor layer 26 may be exposed between the stress cone 70 and the first oil seal layer 104 (i.e., the first oil seal layer 104 may be spaced apart from the stress cone 70).

The seal system 100 (FIG. 1) may include the first oil seal layer 104 described above in reference to FIGS. 10-12. The seal system 100 and methods for forming the same will now be described in further detail with reference to FIGS. 15-23.

Figure 15:
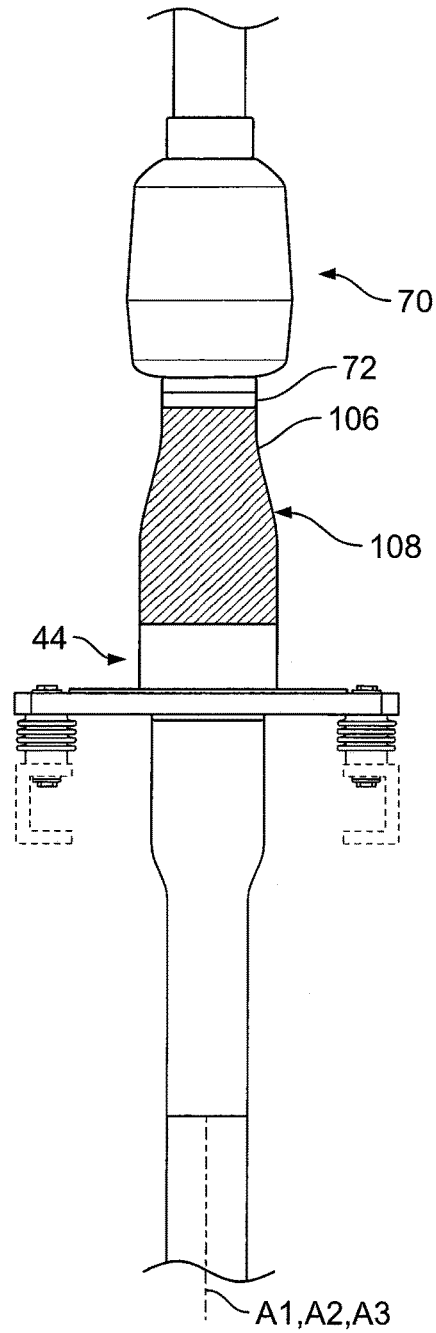
FIG. 15 is a side view illustrating the application of a mastic layer over the first oil seal layer of FIG. 12 according to some embodiments.

Referring to FIG. 15, a mastic layer 108 may be applied over the first oil seal layer 104. The mastic layer 108 may be formed by applying mastic material such as wrapping mastic tape 106 around the first oil seal layer 104. As illustrated in FIG. 15, the mastic material 106 may be applied in a manner to build up the diameter of the seal system 100 above the cable gland 44 to provide a smooth transition from the cable gland 44 to the stress cone 70. The mastic layer 108 may be electrically insulating.

Figures 16, 17:
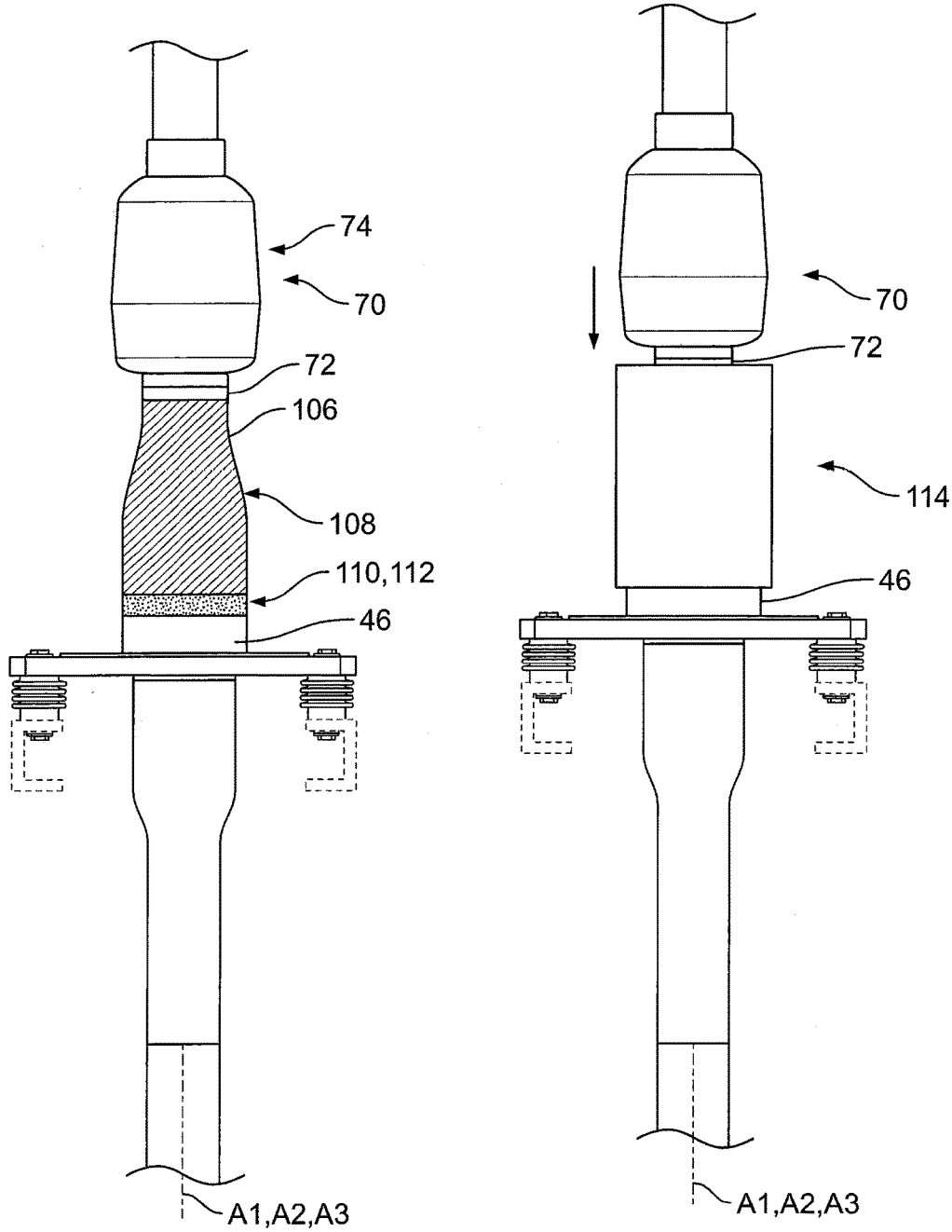

A mastic layer 110 may be applied on the cable gland tubular portion 46 as shown in FIG. 16. Mastic material 112 may be applied to form the mastic layer 110. A suitable mastic material 112 is sealing mastic tape or material available from TE Connectivity.

Referring to FIGS. 17 and 18, a second oil seal layer 116 may be applied over the mastic layer 108 and/or the mastic layer 110. A heat shrinkable tube 114 may be received around the stress cone 70 and moved downwardly to the position shown in FIG. 17. Heat is applied to form the second oil seal layer 116 as shown in FIG. 18.

According to some embodiments, the second oil seal layer 116 overlaps and contacts the conductive collar 72 of the stress cone 70. According to some embodiments, the second oil seal layer 116 overlaps and contacts the cable gland tubular portion 46 (e.g., below the mastic layer 110 shown in FIG. 16).

The heat shrinkable tube 114 may be electrically conductive or semiconductive. Therefore, the second oil seal layer 116 may be a conductive or semiconductor layer. According to some embodiments, the heat shrinkable tube 114 includes EPR or EPDM rubber. A suitable tube 114 is the CNTM product available from TE Connectivity.

The mastic layer 110 may help inhibit or prevent the heat shrinkable tube 114 from sliding or otherwise moving from its desired position during heating.

As illustrated in FIGS. 19 and 20, an electrically conductive layer 120 may be applied over the second oil seal layer 116. The electrically conductive layer 120 may be a copper mesh layer formed by wrapping copper mesh 118 around the second oil seal layer 116. The copper mesh layer 120 may extend above the second oil seal layer 116 and may overlap and/or contact the conductive collar 72 of the stress cone 70. The copper mesh layer 120 may extend below the second oil seal layer 116 and may overlap and/or contact the cable gland tubular portion 46.

As illustrated in FIG. 20, first and second spaced apart oil barrier layers 122, 124 may be applied over the electrically conductive mesh layer 120. Mastic material may be applied to form the oil barrier layers (or mastic layers) 122, 124. A suitable mastic material is sealing mastic tape or material available from TE Connectivity.

The first or upper oil barrier layer 122 may overlap and/or contact the electrically conductive layer 120. The first or upper oil barrier layer 122 may extend above the electrically conductive layer 120 and may overlap and/or contact the conductive collar 72 of the stress cone 70. The first or upper oil barrier layer 122 may also overlap and/or contact the non-conductive portion 74 of the stress cone 70 (e.g., the non-conductive collar portion 75 of the stress cone 70). Alternatively, the electrically conductive layer 120 may extend above the first or upper oil barrier layer 122.

The second or lower oil barrier layer 124 may overlap and/or contact the electrically conductive mesh layer 120. The second or lower oil barrier layer 124 may extend below the electrically conductive mesh layer 120 and may overlap and/or contact the cable gland tubular portion 46. Alternatively, the electrically conductive layer 120 may extend below the second or lower oil barrier layer 122.

According to some embodiments, the first oil barrier layer 122 and/or the second oil barrier layer 124 may be omitted.

Figure 22:
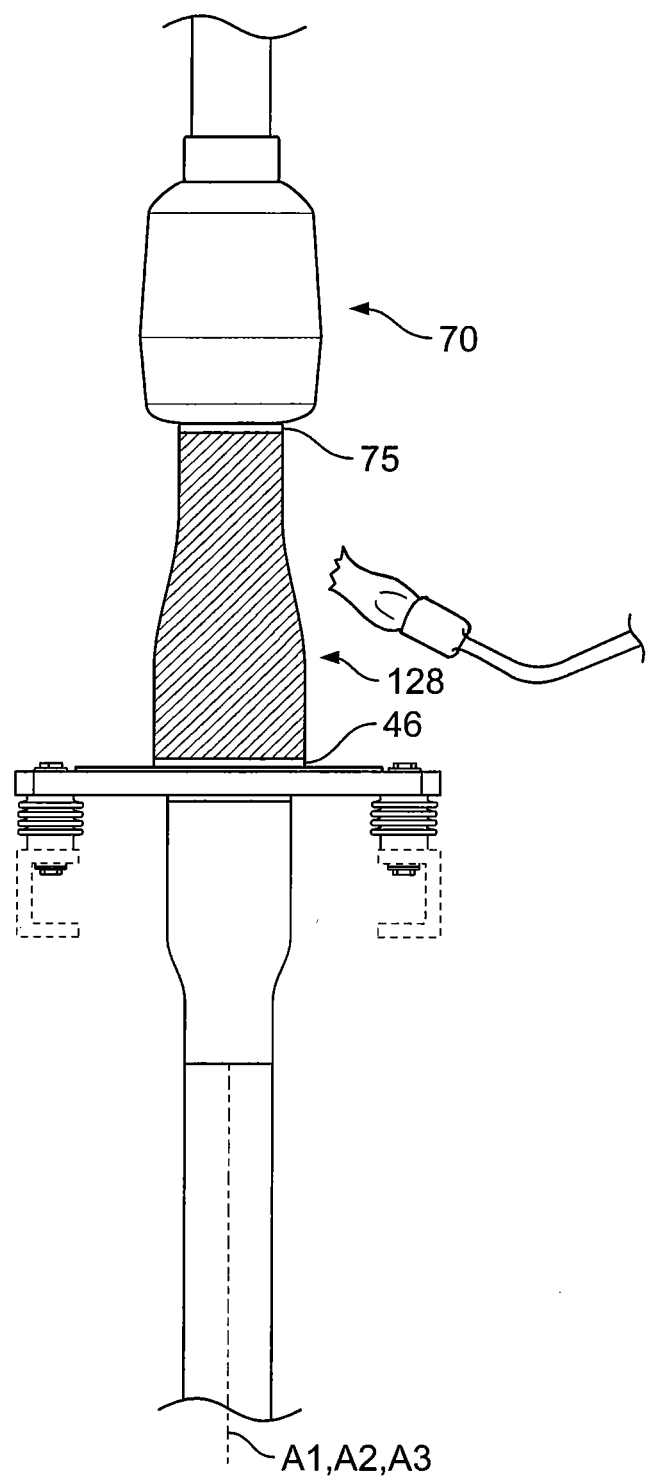

Referring to FIGS. 21 and 22, a third oil seal layer 128 may be applied over the conductive mesh layer 120 and/or the mastic layers 122, 124. A heat shrinkable tube 126 may be received around the stress cone 70 and moved downwardly to the position shown in FIG. 21. Heat is applied to form the third oil seal layer 128 shown in FIG. 22.

According to some embodiments, the third oil seal layer 128 overlaps and contacts the conductive collar 72 of the stress cone 70. The third oil seal layer 128 may also overlap and/or contact the non-conductive portion 74 of the stress cone 70 (e.g., the non-conductive collar portion 75 of the stress cone 70). Alternatively, the electrically conductive layer 120 may extend above the third oil seal layer 128.

According to some embodiments, the third oil seal layer 128 overlaps and contacts the cable gland tubular portion 46 (e.g., below the mastic layer 124 shown in FIG. 20). Alternatively, the electrically conductive layer 120 may extend below the third oil seal layer 128.

As described above, according to some other embodiments, the conductive mesh layer 120 underlies and extends above the third oil seal layer 128 and/or underlies and extends below the third oil seal layer 128.

The heat shrinkable tube 126 may be electrically insulating. Therefore, the third oil seal layer 128 may be an electrically insulating layer. According to some embodiments, the heat shrinkable tube 126 includes EPR or EPDM rubber. A suitable tube 126 is the MWTM (uncoated) product available from TE Connectivity.

Figure 23:
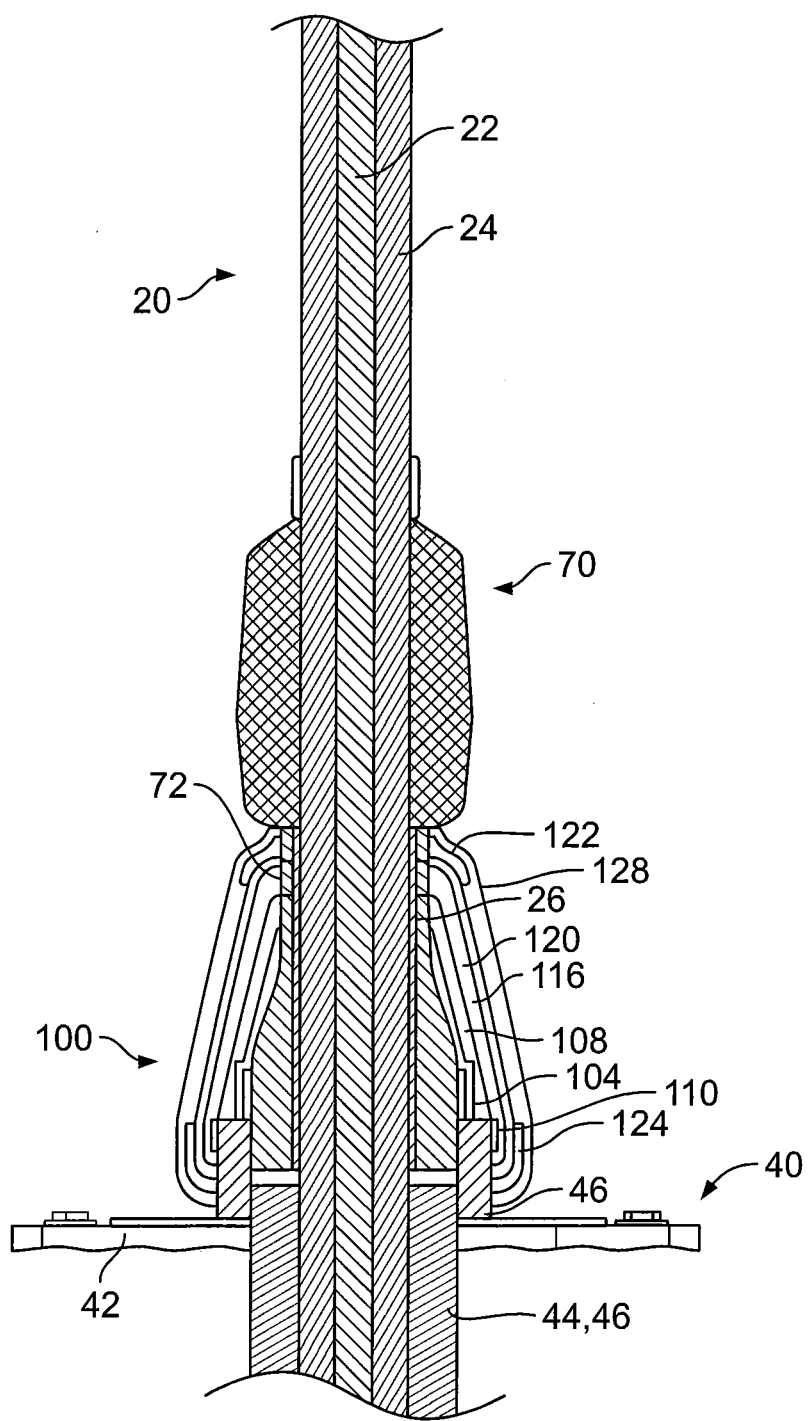
FIG. 23 is a sectional view illustrating an assembly for an oil-filled cable termination including a base plate and cable gland assembly, a stress cone, a cable, and a seal system.

FIG. 23 includes a sectional view of the seal system 100. As described above, the seal system 100 may include the first oil seal layer 104, the second seal layer 116 and the third oil seal layer 128. The first oil seal layer 104 may surround an upper portion of the cable gland 44 and a portion of the cable 20 between the cable gland 44 and the stress cone 70. The first oil seal layer 104 may be spaced apart from the stress cone 70. The second oil seal layer 116 may surround the first oil seal layer 104 and extend between the cable gland 44 and the stress cone 70. The third oil seal layer 128 may surround the second oil seal layer 116 and extend between the cable gland 44 and the stress cone 70. The seal system 100 may include additional layers as described in more detail above.

Figure 24:
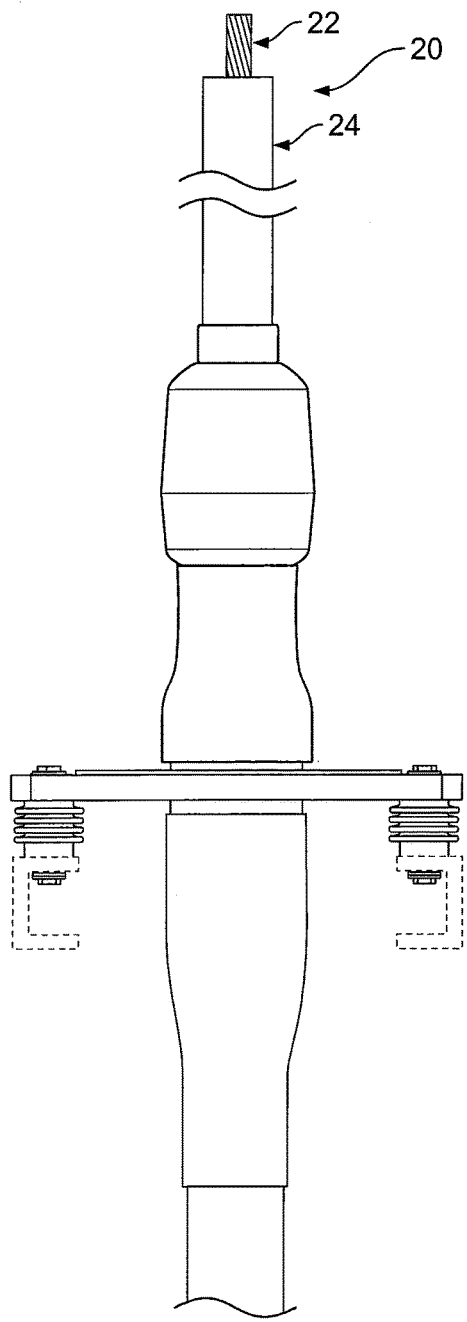
FIG. 24 is a side view of the assembly of FIG. 23 with an insulation layer of the cable removed to expose a conductor of the cable.
Figure 25:
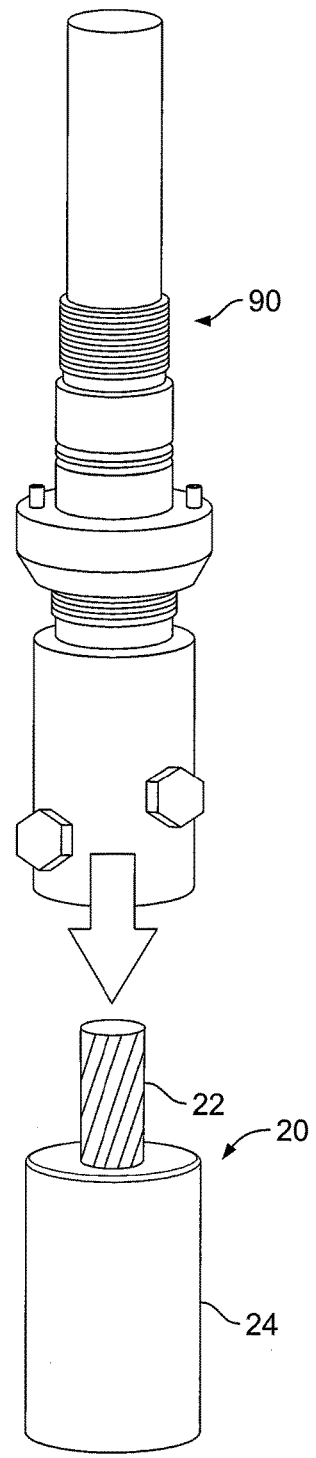
FIG. 25 is a perspective view of the cable conductor of FIG. 24 being received in a lug.

Referring to FIGS. 24 and 25, the conductor 22 of the cable 20 may be exposed by removing a portion of the insulation layer 24 of the cable 20. The conductor 22 is received in a lug 90. As understood by those skilled in the art, a seal may be applied around the lug and the cable. The seal may include, for example, mastic material and/or a heat shrinkable tube.

Figure 26:
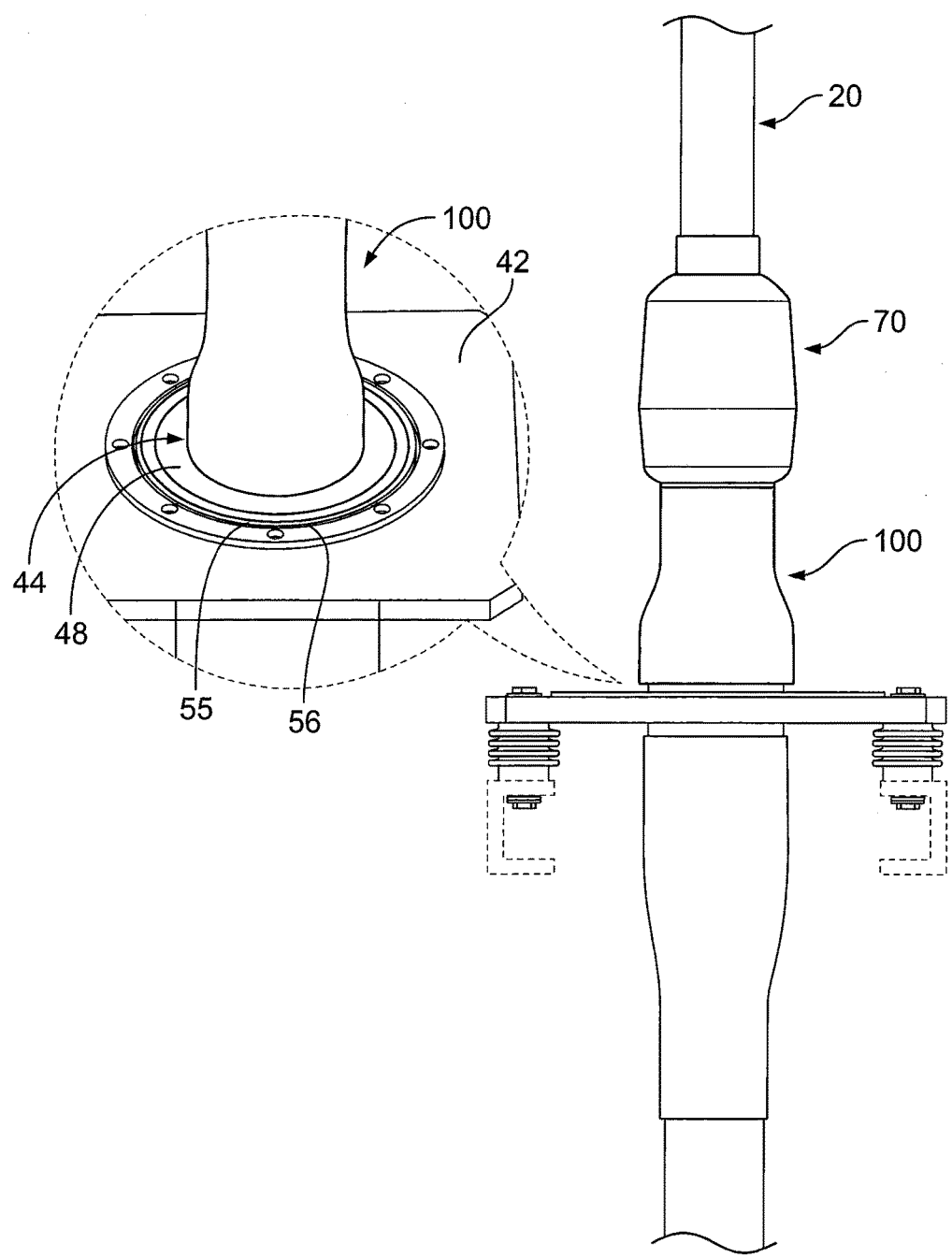
FIG. 26 includes a side view and a fragmentary perspective view of the assembly if FIG. 23.
Figure 27:
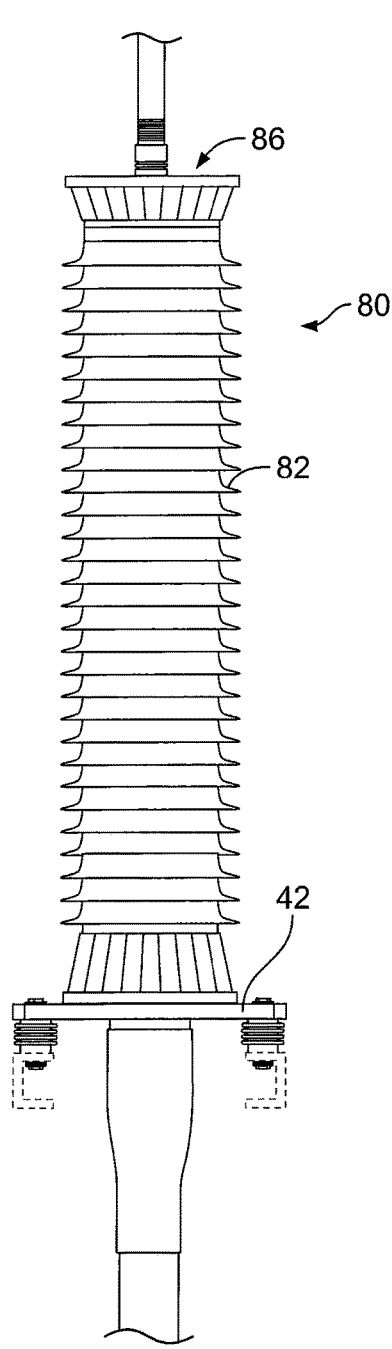
FIG. 27 is a side view of the oil-filled cable termination of FIG. 1 including an insulator housing.
Figure 28:
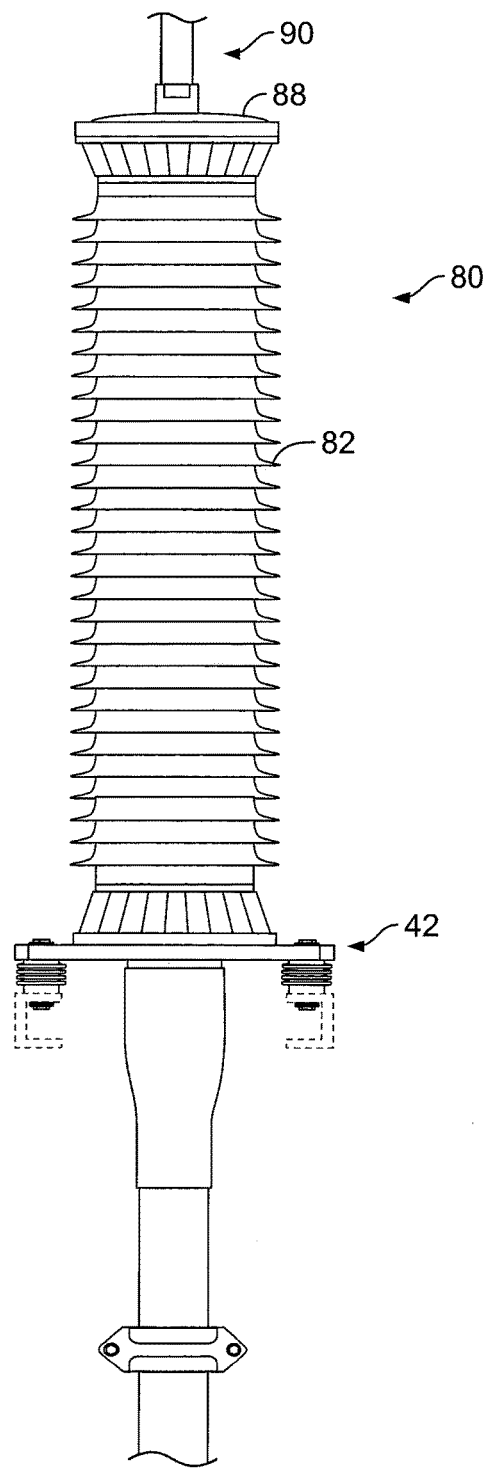
FIG. 28 is a side view of the oil-filled cable termination of FIG. 27 with a top plate installed on the insulator housing.

Referring to FIGS. 26-28, a groove 55 may be defined in the cable gland 44 (e.g., in the cable gland plate portion 48) and an o-ring 56 may be held in the groove 55. The insulator housing 82 is coupled to the base plate 42 to surround the cable 20, the cable gland 44, the stress cone 70 and the seal system 100. The housing 82 may be coupled to the base plate 42 with the o-ring 56 forming a seal therebetween. Oil is received through an opening 86 in the top of the insulator housing 82 to at least partially fill the housing 82 with oil. A top plate 88 is installed on the insulator housing 82.

As understood by those skilled in the art, the base plate 42 may be connected to the grounding system of a tower or other structure.

Some embodiments of the invention are directed to an assembly 200 for use with an oil-filled cable termination. The assembly 200 may include the cable 20, at least a portion of the base plate and cable gland assembly 40, the stress cone 70 and the seal system 100. The assembly 200 may further include other components of the oil-filled cable termination illustrated in FIG. 1.

The seal system 100 according to embodiments described herein can provide improved reliability and reduced installation time relative to known seal systems. Known seal systems include multiple layers of tape wrapped around the cable between the cable gland and the stress cone. The tape can be wrapped at different sealing pressures depending on the craftsmanship of the installer. In contrast, the heat shrinkable tubes forming the oil seal layers described herein can provide a repeatable sealing pressure. For example, the heat shrinkable tube 102 forming the first oil seal layer 104 may have a sealing pressure of about 25 psi.

The heat shrinkable tubes forming the oil seal layers described herein do not have a shelf life (or have a shelf life of many years). On the other hand, the tapes used for known seal systems have a relatively short shelf life (e.g., about two years).

The tapes used for known seal systems may leave adhesive (e.g., on the stress cone) that needs to be removed before the installation is complete. The heat shrinkable tubes forming the oil seal layers described herein do not include adhesive.

The seal system 100 according to embodiments described herein provides two different ways of sealing the oil-filled termination: from the cable gland to the cable (i.e., using the first oil seal layer 104) and from the cable gland to the stress cone (i.e., using the second oil seal layer 116 and/or the third oil seal layer 128). This can provide additional reliability over known seal systems that provide only a seal from the cable gland to the stress cone.

In addition to improved reliability, the seal system 100 according to embodiments described herein can take substantially less time to install than known seal systems for oil-filled terminations. Known seal systems can use multiple layers of tape (e.g., semiconductive tape, EPR self-amalgamating tape, fusible silicone self-amalgamating tape). Wrapping the tape between the cable gland and the stress cone to the correct thickness and the correct sealing pressure can take substantial time. For example, some known seal systems can take up to three hours to install. In contrast, the present inventors have determined that the seal system 100 according to embodiments described herein takes about 45 minutes to install.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. An assembly for use with an oil-filled cable termination, the assembly comprising:
a cable gland;
a cable received in the cable gland;
a stress cone received around the cable and spaced apart from the cable gland; and
a seal system around the cable between the cable gland and the stress cone, the seal system comprising:
a first oil seal layer surrounding an upper portion of the cable gland and a portion of the cable between the cable gland and the stress cone, the first oil seal layer spaced apart from the stress cone;
a second oil seal layer surrounding the first oil seal layer and extending between the cable gland and the stress cone; and
a third oil seal layer surrounding the second oil seal layer and extending between the cable gland and the stress cone.

2. The assembly of claim 1 wherein:
the first oil seal layer comprises a first heat shrinkable tube;
the second oil seal layer comprises a second heat shrinkable tube; and
the third oil seal layer comprises a third heat shrinkable tube.

3. The assembly of claim 2 wherein:
the cable gland comprises a threaded portion;
the first heat shrinkable tube comprises a lower portion and an upper portion, the lower portion comprising threads on an inner surface thereof;
the lower portion of the first heat shrinkable tube is threadingly engaged with the threaded portion of the cable gland; and
the upper portion of the first heat shrinkable tube overlaps and contacts the cable when heat is applied to the heat shrinkable tube to form the first oil seal layer.

4. The assembly of claim 1 wherein the first oil seal layer is electrically conductive or semiconductive.

5. The assembly of claim 1 wherein the second oil seal layer is electrically conductive or semiconductive.

6. The assembly of claim 1 wherein the third oil seal layer is electrically insulating.

7. The assembly of claim 1 further comprising a mastic layer between the first and second oil seal layers, the mastic layer surrounding and contacting the cable gland.

8. The assembly of claim 1 further comprising a copper mesh layer between the second and third oil seal layers, wherein:
the second oil seal layer overlaps and contacts each of the cable gland and the stress cone; and
the copper mesh layer surrounds and contacts the second oil seal layer.

9. The assembly of claim 8 wherein the copper mesh layer overlaps and contacts the cable gland and/or the copper mesh layer overlaps and contacts the stress cone.

10. The assembly of claim 1 further comprising a first oil barrier layer comprising mastic material overlapping and contacting the cable gland and a second oil barrier layer comprising mastic material overlapping and contacting the stress cone, wherein the first and second oil barrier layers are spaced apart from one another, and wherein the first and second oil barrier layers are between the first and second oil seal layers.

11. The assembly of claim 1 wherein:
the cable gland comprises a base portion;
the stress cone comprises a collar portion;
a diameter of the base portion of the cable gland is greater than a diameter of the collar portion of the stress cone; and
the seal system further comprises a mastic tape layer between the first and second oil seal layers that increases a diameter of the seal system adjacent the base portion of the cable gland.

12. A method for forming a seal system for an oil-filled cable termination comprising a cable that is received through each of a cable gland and a stress cone that is spaced apart from the cable gland, the method comprising:

forming a first oil seal layer around the cable by heating a first heat shrinkable tube, wherein the first oil seal layer overlaps and contacts the cable gland and is spaced apart from the stress cone;

forming a second oil seal layer over the first oil seal layer by heating a second heat shrinkable tube, wherein the second oil seal layer extends between the cable gland and the stress cone; and forming a third oil seal layer over the second oil seal layer by heating a third heat shrinkable tube, wherein the third oil seal layer extends between the cable gland and the stress cone.

13. The method of claim 12 further comprising forming a copper mesh layer between the second and third oil seal layers by wrapping copper mesh around the second oil seal layer.

14. The method of claim 13 wherein:
the second oil seal layer overlaps and contacts each of the cable gland and the stress cone;
the copper mesh layer surrounds and contacts the second oil seal layer.

15. The method of claim 12 further comprising applying a mastic layer around the cable gland after forming the first oil seal layer and before forming the second oil seal layer, wherein the second oil seal layer surrounds and contacts the mastic layer.

16. The method of claim 12 wherein:
the cable gland comprises a threaded portion; and
the first heat shrinkable tube comprises a lower portion having an inner surface with threads defined thereon; and
forming the first oil seal layer comprises threadingly engaging the lower portion of the first heat shrinkable tube with the threaded portion of the cable gland and thereafter heating the first heat shrinkable tube.

17. An assembly for use with an oil-filled cable termination, the assembly comprising:
a cable gland comprising a plate portion and a tubular portion, the tubular portion including a first end and an opposite second end, the plate portion surrounding the tubular portion between the first and second ends thereof;
a cable received in the tubular portion of the cable gland;
a base plate comprising a seat defining an opening, wherein the cable gland plate portion is configured to be held on the base plate seat such that the cable and the cable gland tubular portion extend through the opening; and
first and second grommets, the first grommet configured to be received in the cable gland tubular portion at the first end thereof and the second grommet configured to be received in the cable gland tubular portion at the second end thereof, the first and second grommets configured to hold the cable gland tubular portion in position such that the first end of the cable gland tubular portion is above the base plate and the second end of the cable gland tubular portion is below the base plate.

18. The assembly of claim 17 further comprising:
a stress cone received around the cable and spaced apart from the cable gland; and
a seal system around the cable between the cable gland and the stress cone, the seal system comprising:
a first oil seal layer surrounding an upper portion of the cable gland and a portion of the cable between the cable gland and the stress cone, the first oil seal layer spaced apart from the stress cone, the first oil seal layer formed by heating a first heat shrinkable tube;
a second oil seal layer surrounding the first oil seal layer and extending between the cable gland and the stress cone, the second oil seal layer formed by heating a second heat shrinkable tube; and
a third oil seal layer surrounding the second oil seal layer and extending between the cable gland and the stress cone, the third oil seal layer formed by heating a third heat shrinkable tube.

19. The assembly of claim 18 further comprising an insulator housing coupled to the base plate and surrounding the cable above the base plate, the cable gland tubular portion above the base plate and the stress cone.

* * * * *